United States Patent [19]
Null

[11] 3,721,218
[45] March 20, 1973

[54] ROTARY INTERNAL COMBUSTION ENGINE

[76] Inventor: Victor G. Null, 19 Kingsway Drive, Wentzville, Mo. 63385

[22] Filed: Nov. 18, 1970

[21] Appl. No.: 90,750

[52] U.S. Cl............123/8.13, 123/8.35, 123/8.39, 418/94, 418/97, 418/145, 418/224, 418/252, 418/261, 418/266
[51] Int. Cl....................F02b 53/06, F02b 53/10
[58] Field of Search..........123/8.11, 8.09, 8.21, 8.35, 123/8.13, 8.39, 8.43; 418/97, 94, 145, 224, 252, 261; 417/204, 442

[56] References Cited

UNITED STATES PATENTS

| | | | |
|---|---|---|---|
| 3,398,725 | 8/1968 | Null | 418/224 X |
| 629,796 | 8/1899 | Lobee | 418/252 X |
| 2,864,346 | 12/1958 | Taylor, Jr. | 123/8.09 |
| 2,263,274 | 11/1941 | Pieper | 123/8.11 |
| 2,263,275 | 11/1941 | Pieper | 123/8.11 |
| 2,781,000 | 2/1957 | Thomas et al. | 418/252 X |
| 3,461,849 | 8/1969 | Kelly | 123/8.39 X |
| 3,478,728 | 11/1969 | Kelly | 123/8.39 X |

FOREIGN PATENTS OR APPLICATIONS

| | | | |
|---|---|---|---|
| 321,112 | 10/1929 | Great Britain | 123/8.21 |

*Primary Examiner*—Allan D. Herrmann
*Attorney*—Bedell & Burgess

[57] ABSTRACT

A rotary internal combustion engine has a cylindrical rotor eccentrically mounted within a circular cavity in the stator, the rotor being formed with a central axial fuel mixture inlet passageway and with a plurality of radial cavities in which are slidably mounted piston vanes, the crowns of which protrude from the rotor and are biased into closely spaced relation with the periphery of the block cavity to form therewith sealed compression-combustion chambers in the crescent-shaped spaces between the rotor and periphery of the block cavity. Sealing elements closely spaced from the block cavity periphery bisect the piston vane crowns in planes coincident with the rotor axis and each piston vane is formed with a pair of intake valves disposed respectively fore and aft of the sealing elements and sequentially operable to pass fuel mixture from the central inlet passageway into the combustion chambers defined within the crescent-shaped spaces by a pair of adjacent pistons and thereby materially increase the volumetric efficiency of the engine as compared with engines of the prior art having only a single inlet valve per combustion chamber. In one embodiment, wiper bars engageable with the block cavity surface are resiliently mounted in the piston crown so as to maintain a tight seal against the periphery of the block cavity while yieldably spacing the piston crown rings therefrom.

30 Claims, 24 Drawing Figures

INVENTOR
VICTOR G. NULL
BY
Bedell & Burgess
ATTORNEYS

INVENTOR
VICTOR G. NULL
BY
*Bedell & Burgess*
ATTORNEYS

INVENTOR
VICTOR G. NULL
BY
Bedell & Burgess
ATTORNEYS

INVENTOR
VICTOR G. NULL
BY
Bedell & Burgess
ATTORNEYS

INVENTOR
VICTOR G. NULL

BY
*Bedell & Burgess*
ATTORNEYS

FIG. 22

ROTARY INTERNAL COMBUSTION ENGINE

BACKGROUND OF THE INVENTION

1. Field of the Invention

The invention relates to rotary internal combustion engines of the type having a cylindrical rotor eccentrically mounted in a circular cavity in the stator with radial pistons in the rotor forming impeller vanes.

2. The Prior Art

The closest prior art to the present invention is present in applicant's U.S. Pat. No. 3,398,725 in which each piston vane has a single pressure responsive intake passage in each vane with its valves arranged to open and admit fuel at the beginning of the intake stroke of each cycle.

SUMMARY OF THE INVENTION

The invention provides, in a rotary internal combustion engine of the type having an eccentric cylindrical rotor with radially movable piston vanes, a substantially greater fuel intake capacity and higher compression ratio, with consequent increased volumetric efficiency than prior engines, by sequentially injecting fuel mixture into each combustion chamber through both of the piston vanes which define each combustion chamber. It provides a rotary internal combustion engine having a longer power cycle than any other internal combustion engine and a combustion chamber which gets three times larger than the volume of fuel-air ratio it initially drew in, which is capable of consuming all carbon monoxide, more efficient cooling, more complete combustion, more efficient intake breathing, and exhausting. The invention further provides an effective unique sealing technique, between piston and vane, and rotor and housing, means for removing piston vanes from rotor without disassembling the entire engine by access through the exhaust plug.

DESCRIPTION OF THE PREFERRED EMBODIMENT

The engine stator comprises an annular block 1, to the flat ends of which are secured generally disk-shaped front and rear end plates 3 and 5 by suitable bolts 11. Front end plate 3 is formed with a slightly eccentric generally cylindrical outboard projection 13 having an upwardly facing flat surface 15 for mounting a carburetor by means of studs 17.

A cylindrical rotor 19 is eccentrically positioned within annular block 1 between end plates 3 and 5, and is formed with a central axial recess 21. A hollow cylindrical hub 23 is tightly fitted into rotor recess 21 and projects outwardly therefrom. The projecting portion 25 is rotatably journaled, preferably by ball bearings 25 in end plate 5, and extends therefrom outwardly through end plate projection 13, projecting outwardly therefrom to mount accessory pulleys 27. Hub 23 is formed with an axial cavity 29 extending from its inner end through extension 25 and terminating beneath carburetor mounting surface 15, where it communicates, via radial apertures 31, with fuel mixture inlet 33 through the top of end plate projection 13.

Hub 23 also is formed with a ring gear 35, enclosed by end plate 3, and secured in abutting relation to the transverse face 37 of rotor 19, and starter motor 39 is secured to suitable flanges 41 on front end plate 3, with its pinion 43 selectively engageable with ring gear 35.

The opposite face 45 of rotor 19 is formed with a shallow integral hub 47 rotatably journaled in end plate 5 by ball bearings 49.

Rear end plate 5 is formed with a housing 51 projecting rearwardly from it, and closed at its outer end by a cover plate 53.

For transmitting torque from rotor 1, hub 47 mounts a hollow output pinion 55, and drive shaft 57, journaled at 59 in the wall structure of housing 51 and at 61 in housing cover plate 53, is provided with a gear 63 which meshes with rotor output pinion 55, preferably at a ratio in the order of 2:1.

Annular block 1 contains an annular liner 65 formed on its cylindrical inner surface with a shallow concave toroidal cavity 67, and is formed along its margins with inwardly directed radial flanges 69 and 71, the rims of which are circular concentric with the rotor axis. The purpose of flanges 69 and 71 is to cooperate with opposing marginal cylindrical surfaces of rotor 19 to effect a seal of the crescent-shaped space between the outer periphery of the rotor and the interior of liner 65, so that this space can function effectively as the compression and combustion chamber of the engine.

Rotor 19 is formed with a plurality of radial cavities 73(1), (2) and (3) preferably three in number and spaced equiangularly throughout the rotor, the bottom of each of said cavities communicating with rotor cavity 21 via short radial passageways 75, controlled by pressure-responsive disk check valves 77.

To serve as impeller vanes on the rotor, pistons 79(1), (2) and (3) are radially slidably mounted respectively in cavities 73(1), (2) and (3).

Figure 1:
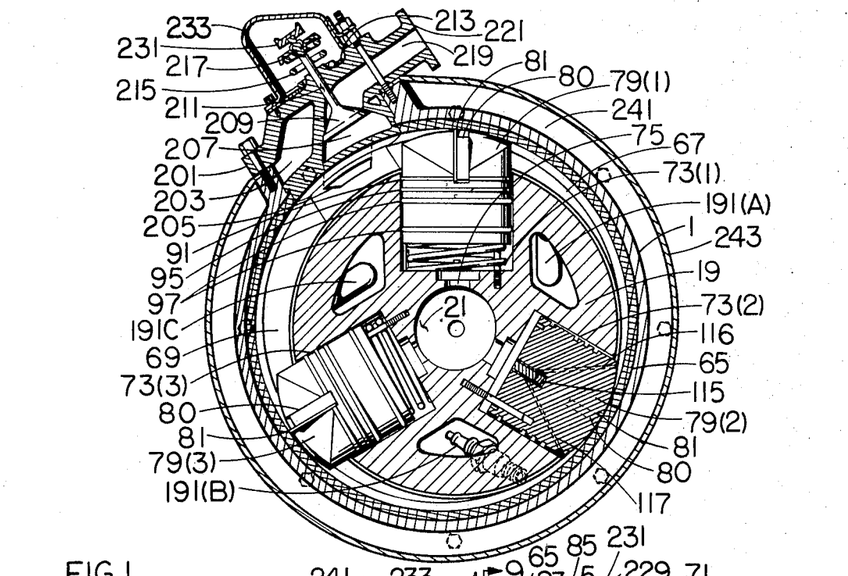
FIG. 1 is a transverse sectional view through the stator block and rotor of an engine embodying the invention.
Figure 2:
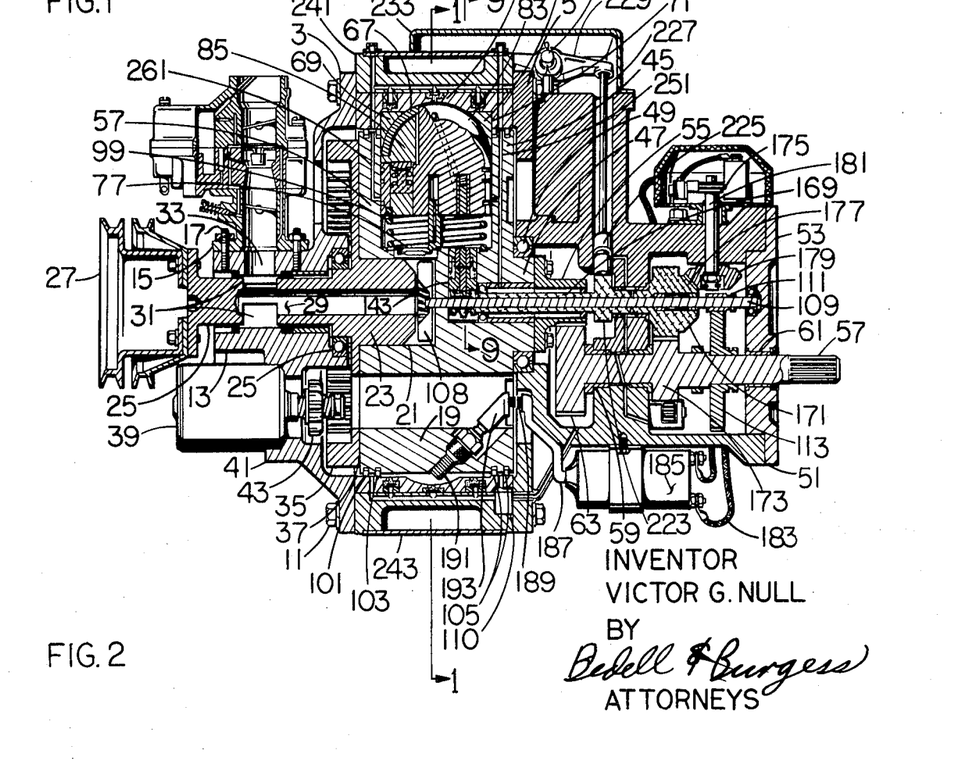
FIG. 2 is a diametral vertical sectional view along line 2—2 of FIG. 1.

The outer end or crown 80 of each of the piston vanes 79(1), (2) and (3) is of semicircular shape along the diameter parallel to the rotor axis, and is of arcuate shape along the diameter normal to the rotor axis, the arc being of slightly less radius than the outer surface of the rotor whereby when the piston is fully compressed within the rotor (e.g. piston 79(2) in FIG. 1), the intersection of the arc and the cylindrical surface of the piston will be nearly flush with the periphery of the rotor.

Figures 3, 4, 5, 6, 7, 8:
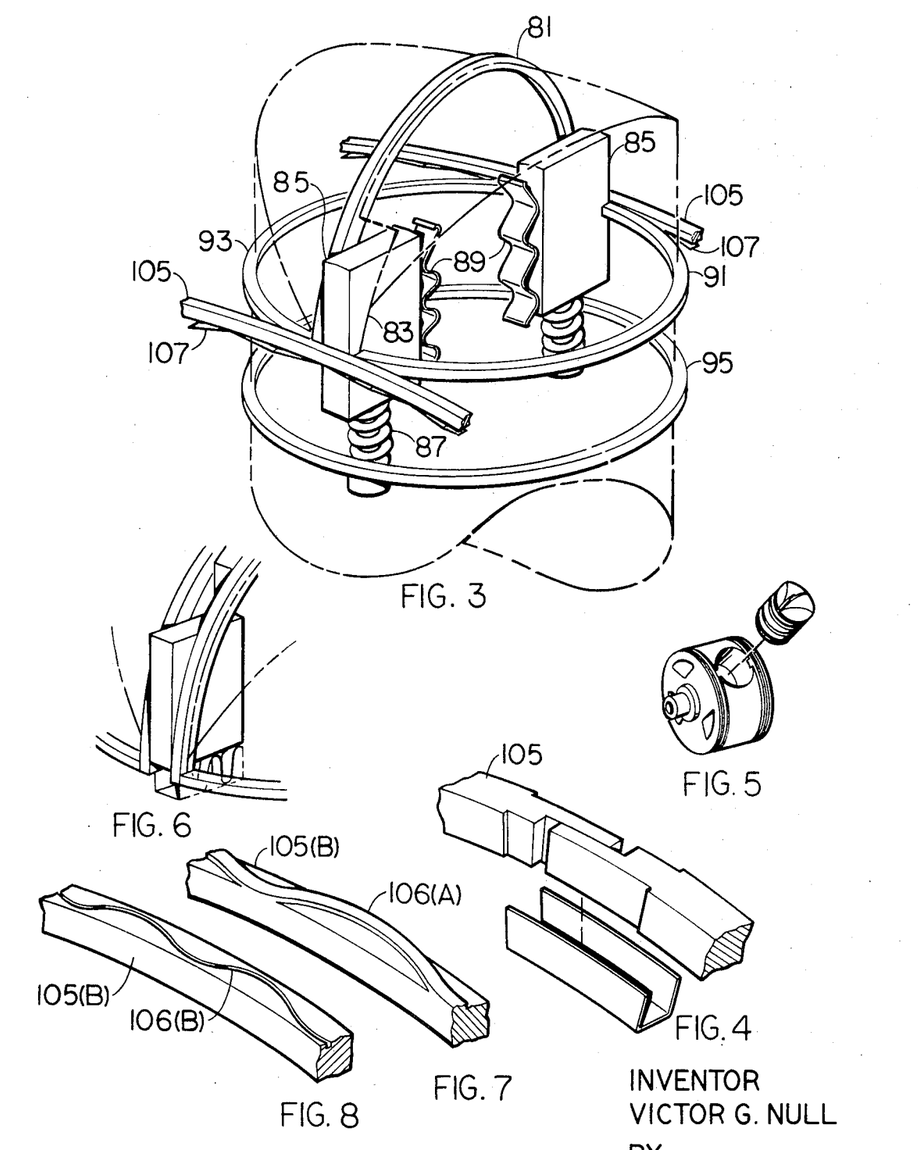
FIG. 3 is a view of the outer end portion of the piston, showing sealing means including rings and wiping bars.
FIG. 4 is a fragmentary view of the joint portion of rotor compression rings.
FIG. 5 is a perspective view of the rotor with one piston withdrawn.
FIG. 6 is a fragmentary view corresponding to a part of FIG. 3 but showing a modification of the crown ring arrangement.
FIGS. 7 and 8 show modified forms of the rotor compression rings.

The construction of the piston crown and outer portion can best be seen in FIG. 3, in which numeral 81 denotes a semicircular crown ring mounted in a suitable groove in the crown of the piston along a diametral plane coincident with the rotor axis. Ring 81 slidably engages the toroidal cavity 67 of block liner 65 where it provides a seal between the piston vanes and crown ring and also helps to dissipate heat from combustion of the fuel mixture.

Parallel and immediately adjacent to ring 81, the crown and adjacent portion of the sides of each piston are formed with flat slots 83, and rectangular wiper bars 85 are slidably mounted in slots 83. Compression coil springs 87 seated in recesses in the piston below wiper bars 85 bear against the lower ends of wiper bars 85 to bias them against the cylindrical inner surface of body liner 65, and corrugated leaf springs 89 between the inner sides of wiper bars 85 and the inner axial surfaces of slots 83 bias the wiper bars outwardly into engagement with the piston cavity surfaces of the rotor, and liner flanges 69 and 71 respectively. Wiper bars 85 thus form a seal between the piston vane crowns 80 and the cylindrical flange surfaces of annular liners 65, resiliently support the piston vanes from the liners, serve as scrapers to prevent accumulation of carbon and other deposits on the liner surface, and help to dissipate the heat of combustion.

At the base of the piston vane crown, a pair of nearly semicircular rings 91 and 93 are seated in an annular groove with their respective ends engaging crown ring 81 and wiper bars 85. Semicircular rings 91 and 93 function as scraper rings and heat dissipators. Spaced downwardly from rings 91 and 93, a cast iron one-piece compression ring 95 is seated in an annular groove in the piston. Ring 95 also functions as a heat dissipator. In spaced relation below ring 95, each piston vane is formed with spaced annular grooves in which are seated resilient O-rings 97 to provide a positive seal between each piston and its cavity wall.

For biasing piston vanes 79(1) (2) and (3) outwardly radially of the rotor into sliding sealing engagement with block liner 25, a coil spring 99 is seated in the bottom of each piston vane cavity and bears against the bottom of the respective piston vane.

To completely seal the compression and combustion chambers defined by rotor 19, piston vanes 73(1) (2) and (3) and block annular liner 65, the cylindrical marginal portions of the rotor on both sides of the piston cavities are formed with pairs of spaced annular grooves 101 and 103, the inner grooves 103 being tangent to the piston cavities, and compression rings 105 of rectangular cross section are received in grooves 101 and 103, being biased outwardly therein into sealing engagement with the circular inner faces of liner flanges 69 and 71 by flat metal expander rings 107 seated in grooves 101 and 103 beneath compression rings 105. FIGS. 7 and 8 illustrate alternate forms of compression rings with means for retaining lubricant on the rings. In FIG. 7, this is effected by a shallow sinuous rib 106a on the outer peripheral surface of the ring, while ring 105b is formed with a sinuous groove 106b in its outer peripheral surface.

THE FUEL SYSTEM

For admitting fuel mixture from the carburetor C mounted on surface 15 of end plate projection 13 as rotor 19 rotates within engine block springs 99 and centrifugal force bias the piston vanes radially outwardly to maintain their crown rings 81 in engagement with block liner 65, check valves 77 move radially outwardly responsive to pressure of the fuel-air mixture in passageway 29 and rotor cavity 21 as piston vanes 73(1), (2) or (3) move outwardly, because of the resultant reduction in pressure in the piston cavities below the piston vanes, and fuel mixture passes into the respective piston vane cavities; as the piston vanes are caused to move radially inwardly, the pressure in their cavities closes the associated check valves 77, preventing return of the fuel mixture into the rotor central cavity 21 and initially compresses the mixture, which is thereafter discharged, as will be described hereinafter into the compression-combustion chambers between rotor 19 and body liner 65.

To accelerate the passage of fuel mixture from the carburetor to the piston vane cavities, an impeller blower 108 is positioned in the outlet end portion of rotor cavity 21 adjacent passages 75 to the piston cavities, and blower shaft 109 extends through rotor axial cavity 110 (separate from cavity 21) and is journaled at its end portions in the rotor wall structure and gear housing end plate 53, where it mounts a pinion 111 which meshes with a much larger gear 113 on engine output shaft 57 to provide relatively high angular velocity on the blower.

For injecting the fuel mixture into the compression-combustion chambers defined by the peripheral surface of rotor 19, the inner surface of block liner 65, and the adjacent piston vanes 79(1) (2) and (3), each of the piston vanes is formed with an axially extending cylindrical bore 115 in its base, and a pair of diverging passages 116 and 117 connecting bore 115 with piston crown surface 80 respectively fore and aft of crown ring 81.

Figures 11, 12, 13:
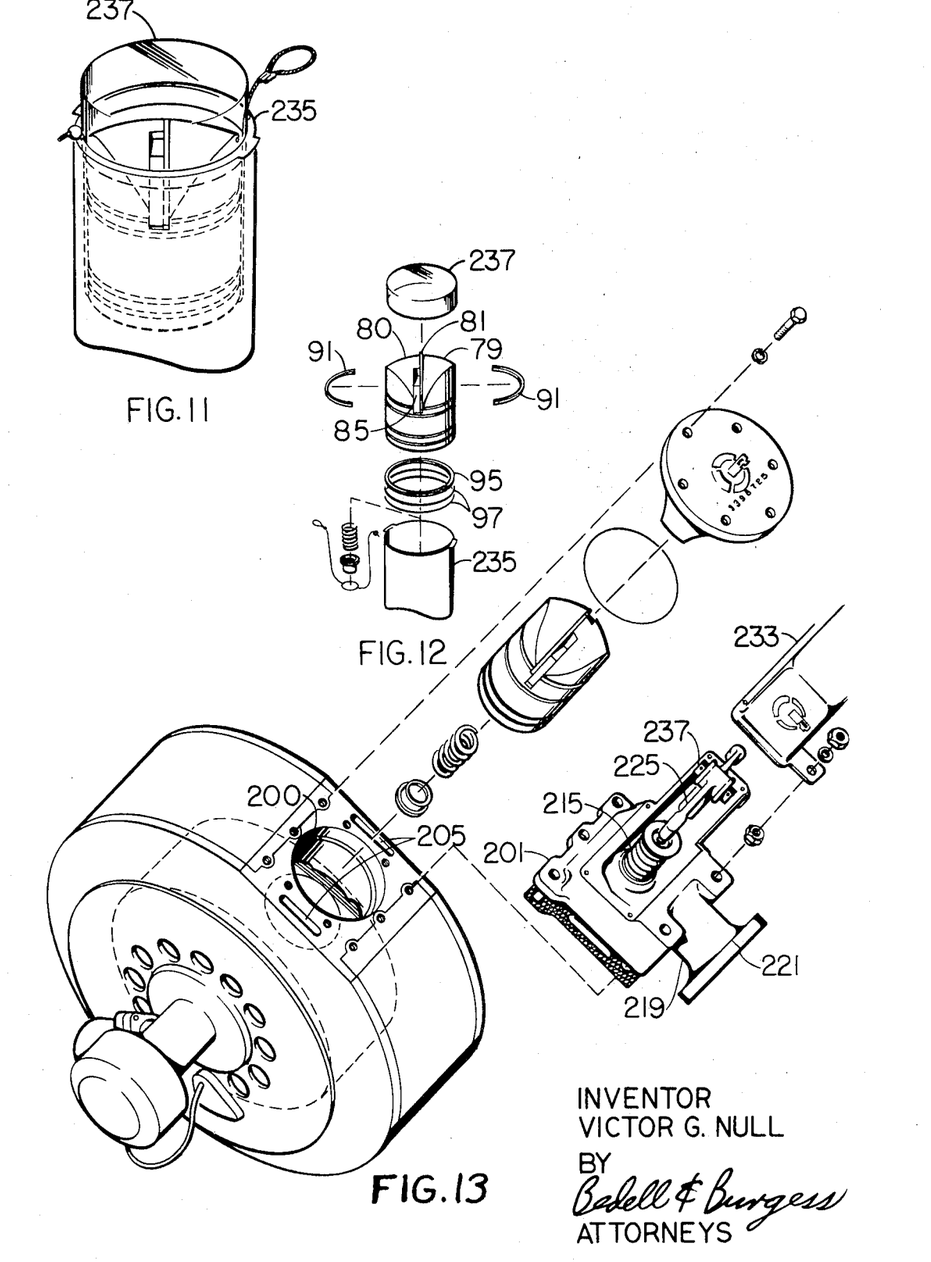
FIG. 11 is a perspective view of an overhaul or replacement piston vane kit.
FIG. 12 is a disassembled view of the piston vane and kit components.
FIG. 13 is a perspective view of the engine showing the exhaust valve plug and its utility in removing and replacing piston vanes.

For sequentially providing and shutting off communication between piston cavities 73 below the pistons and the exterior of the rotor, a valve, comprising a sleeve 119 slidably mounted in bore 115 and a spool 121 slidably mounted within sleeve 119 is incorporated in each of the piston vanes, as best seen in FIG. 13.

Sleeve 119 and spool 121 are normally retained in bore 115 with their flat lower ends flush with the flat base of piston 79 and are resiliently biased into this position by coil springs 123 and 125 which bear against their upper ends respectively.

The lower end of each piston 19 is formed with a sloping fuel mixture inlet passage connecting the base of the piston with valve bore 115 at a lower level than the intersections of fuel outlet passages 116 and 117 with bore 115. It will be noted that outlet passage 117 intersects bore 115 at a different and lower level from passage 116.

Sleeve 119 is formed with an inlet port 129 normally aligned with piston inlet passage 127 and with an outlet port 131 normally registering with outlet passage 117, communication between ports 129 and 131 being normally blocked by spool 121.

For selectively providing communication between inlet port 129 and outlet port 131 whereby to permit compressed fuel mixture to pass from the piston cavity 73 below the piston to the space between the rotor and engine block, valve spool 121 is formed with a sloping transverse passage 133 positioned for simultaneous registry with ports 129 and 131 when spool 121 is fully depressed into piston bore 115.

For providing communication between the space within piston cavity 73 below the piston base and outlet passage 116, spool 121 is formed with a passage 135 connecting transverse passage 133 and the exterior of the spool at the same level as the intersection of passage 116 and 115, and sleeve 119 is formed with an outlet port 137 adapted for registry with spool passage 135 outlet and passage 116 when sleeve 119 is fully depressed within piston 79, such depression at the same time causing sleeve 119 to uncover the inlet end of transverse passage 133.

For sequentially connecting outlet passages 116 and 117 to the space, or fuel mixture compression chambers, below the pistons in the piston cavities, in accordance with the relative positions of the pistons in the engine body, the central portion of rotor 19 is formed with radial bores 139 communicating respectively with the bottom of each piston cavity in alignment with piston bores 115, and a cylindrical guide sleeve 141 is fixed in the outer end of each bore 139 with its outer end flush with the bottom surface of cavity 73.

For actuating valve sleeves 119, a sleeve lifter 143 of the same diameter and thickness as valve sleeve 119 is slidably mounted in guide sleeve 141, with its enlarged inner end 145 projecting into a cam cavity 147 formed in the center of the rotor.

For actuating valve spool 121, a cylindrical tappet 149 is slidably mounted in sleeve lifter 143, the inner end surface 151 of which is formed with conical cavity surrounding the projecting inner end of tappet 149, and in turn surrounded by an annular rim 152.

For sequentially operating cylindrical tappets 149 and sleeve lifters 143, in accordance with the relative positions of piston vanes 79(1) (2) and (3) in the engine body, a three-part cam, comprising a central part 153 engageable with the inner end faces of tappets 149 and identical side parts 155 engageable with rims 152 of sleeve lifters 143.

For maintaining each sleeve 143 lifter rim 152 in engagement with cam parts 155, a coil spring 157 is positioned in bore 139 between the inner end of guide sleeve 141 and the enlarged inner end portion 145 of sleeve lifter 143.

For maintaining each cylindrical tappet 149 in constant engagement with cam parts 153, the inner end of guide sleeve 141 has an enlarged bore in which is seated a coil spring 159, the inner end of which bears against a washer 161 seated against pin 163 which passes through tappet 149 and projects outwardly thereof through axially elongated slots 167 in sleeve lifter 143 so as to permit relative axial movements of tappet 149 and sleeve lifter 143, caused by cam parts 153 and 155.

Cam 153, 155 is formed on a hollow shaft 169 which surrounds blower shaft 109 and extends outwardly through rotor hub 47 and hollow rotor output pinion 55, and terminates in gear 171, which in turn meshes with and is driven by a gear 173 on engine output shaft 57, so that the operation of cam 153, 155, of sleeve lifter 143 and tappet 149, and valve sleeve 119 and valve spool 121 is directly responsive to speed of the rotor. The gear reduction from rotor 19 to camshaft 169 is 2:1 so that for every two revolutions of the rotor, camshaft 169 makes a single revolution.

With this arrangement, during the first revolution of rotor 19, each piston vane 79(1), (2) and (3) injects fuel mixture into the combustion chamber through its aft outlet passage 116, and during the second revolution of the rotor, each piston vane injects fuel mixture into the combustion chamber through its forward outlet passage 117.

Figures 9, 10:
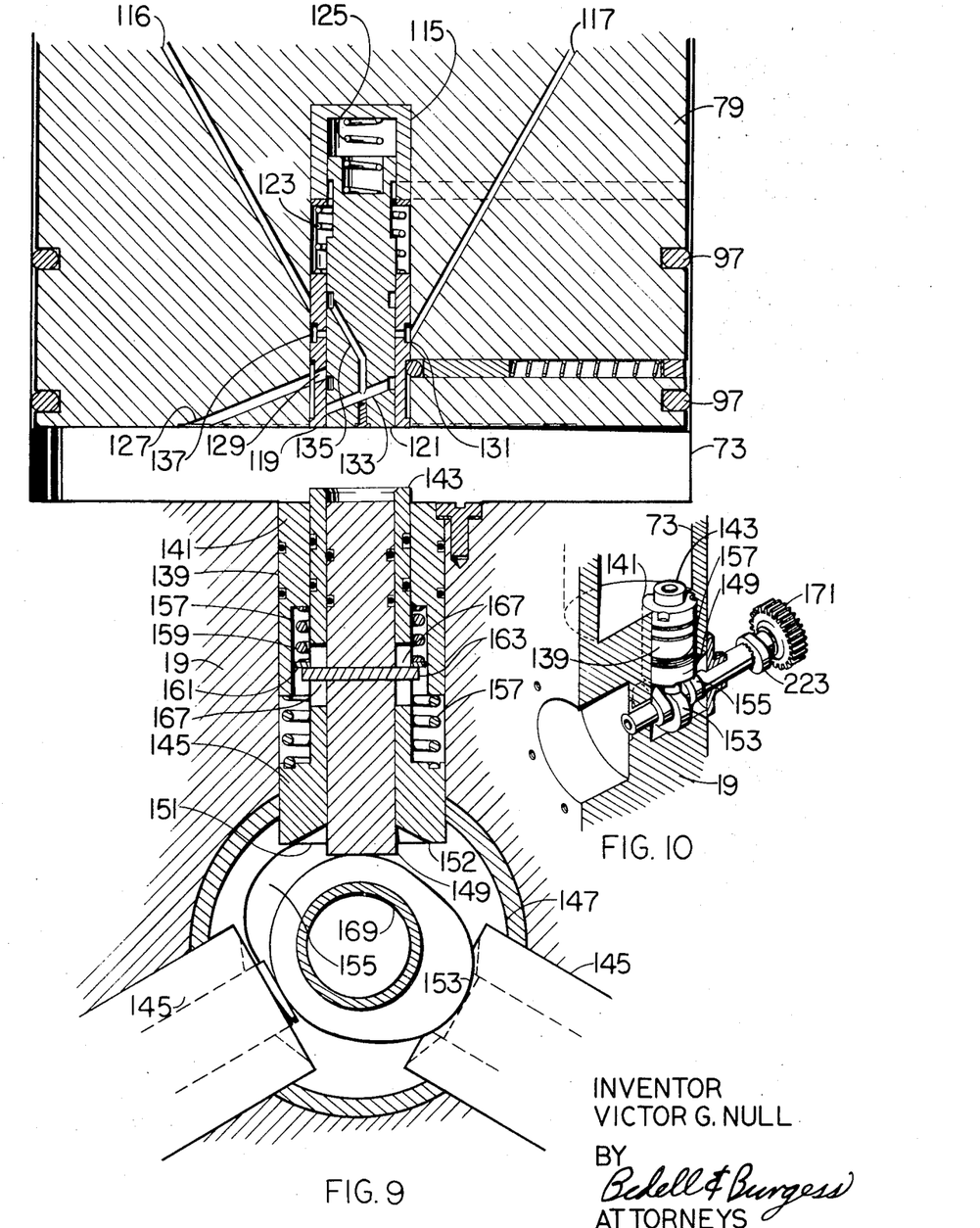
FIG. 9 is a diametral sectional view of the base portion of a piston vane and adjacent portions of the rotor showing piston vane valves, valve lifters and valve cams.
FIG. 10 is a cut-away perspective view of the rotor, valve lifter and components shown in FIG. 9.

As the rotor rotates in the engine body the piston vanes reciprocate in their cavities 73(1), (2) and (3) between the innermost position occupied by piston 79(2) in FIG. 1 to outermost position in the region between piston vanes 73(3) and 73(1). During the outward stroke, i.e., as the piston vane moves clockwise from the position of piston vane 79(2) toward the position of vane 79(3) creating a reduction in pressure in piston cavity 73, the superior pressure in the rotor cavity causes check valve 75 to open admitting fuel mixture to the piston cavity below the piston vane, as the rotor continues to revolve toward the vane 79(2) position, the piston vane is forced inwardly, compressing the fuel mixture below it in the piston cavity, at which point (see also FIG. 9) cam part 155 causes lifter sleeve 143 to project upwardly from the bottom of the cavity and engage valve sleeve 119, raising the same to open spool passage 133 to the base of the piston vane and align valve sleeve port 137 with spool passage 135 and outlet passage 116, thereby permitting fuel mixture to pass from the interior of piston vane cavity 73 to the combustion chamber on the aft side of piston crown ring 81. Cam parts 153 and 155 are 180° out of phase with each other so that when sleeve lifter 143 is raised, tappet 149 is retracted, and since camshaft 169 rotates at half the speed of rotor 19, when the latter makes a further revolution, to return the piston to the position of piston vane 79(2) in FIG. 1, sleeve lifter 143 will be retracted and spool lifter 149 projected, to engage valve spool 129 and cause passages 133 therethrough to become aligned with piston vane inlet passage 127 and forward outlet passage 117, thus permitting compressed fuel mixture to pass therethrough from the piston vane cavity forward of crown ring 81.

Since the fore and aft injection described above occurs in each of the piston vanes it will be evident that each combustion chamber defined by adjacent piston vanes will receive two fuel mixture charges per cycle, thereby substantially increasing its volumetric efficiency.

THE IGNITION SYSTEM

The ignition system comprises an ignition cam 175 on top of gear housing 51 of camshaft 169 and driven by cooperating bevel gears 177 on the camshaft and 179 on vertical ignition camshaft 181. A wire 183 leads from ignition cam 175 to coil 185, and from the latter a single secondary wire 187 leads to contact 189 in an opening in engine end plate 5 slightly forward in a clockwise direction, from the point of tangency of rotor 19 and engine body liner 65, and the rotor mounts surface gap spark plugs 191 between adjacent piston vanes 79(1) (2) and (3) and projecting outwardly from the periphery of the rotor into toroidal cavity 67 slightly forward of each of the piston vanes. Each spark plug has a contact 193 projecting from the rotor face adjacent end plate 5, and at the same radial distance from the rotor axis, for wiping engagement with ignition coil contact 189 so that, as the rotor revolves, when plug contact 193 passes coil contact 187, if the latter is energized by ignition cam 175 and coil 185, the plug will fire, igniting the fuel mixture in its combustion chamber.

THE EXHAUST SYSTEM

The exhaust system comprises a circular hole 200 in the block, a removable plug 201 having an inner wall 203 of similar contour to that of block liner 65, so as to form part of thereof when inserted in hole 200, as seen in FIG. 1. Inner wall 203 is formed with a pair of circumferentially elongated exhaust slots 205 in the cylindrical surfaces on opposite sides of toroidal cavity 67, which communicate with conical valve seat chamber 207, in which exhaust valve 209 is positioned by its stem 211 which is slidably mounted generally radial of the engine in plug section outer wall 213. A coil spring 215 surrounding valve stem 211 and seated against the outer surface of wall 213 bears against a washer 217 mounted on valve stem 211 and biases the valve outwardly into sealing engagement with the conical valve seat of chamber 207. Posterior to valve 209 an exhaust conduit 219 terminates in a flange 221 for attachment of the usual exhaust pipe (not shown).

For opening exhaust valve 209 at the proper sequence in each operating cycle of the engine, an exhaust cam 223 is mounted on camshaft 169 and its tappet 225 and push rod 227 extend upwardly therefrom to connect with rocker arm 229, which is fulcrumed on housing 51 at 231. The end of rocker arm 229 remote from push rod 227 bears against the outer end of valve stem 211 to push the valve 209 inwardly to open or exhaust position whenever cam 223 raises push rod 227. The upper end of push rod 227, rocker arm 229, valve stem 211, spring 215 and washer 217 are protectively enclosed by pressed sheet metal housing 233 removably secured to the top of exhaust system section 201.

A corollary feature of the removable exhaust plug is that its removability permits removal and replacement of piston vanes 79(1) (2) or (3) without the necessity of disassembling the entire engine. This may be accomplished, as best seen in FIG. 13, by removing the exhaust plug from the engine block, rotating the rotor to align the desired piston vane with plug section hole 200 and extracting the piston vane through the hole.

Replacement pistons may be preassembled as a kit, as seen in FIG. 11, comprising a cylindrical element 235 surrounding the vane and retaining the rings in compressed relation therein and a cylindrical cap. The entire assembly is inserted through exhaust plug hole 200 until the lower edge of cylindrical retainer element 235 engages the rotor periphery, after which the piston vane is pushed through the cylindrical element into the vacant piston vane cavity 73, after which cylindrical element 235 and cap 237 are extracted from exhaust plug hole 200, and exhaust plug 201 replaced.

THE COOLING SYSTEM

The engine may be water-cooled. To this effect annular block 1 is of outwardly open channel cross section, having outward radial flanges 241, to the outer circumference of which is sealingly secured a sheet metal water jacket 243. Water or other suitable coolant may be circulated through the cooling chamber by a conventional automobile water pump (not shown) driven off the engine output shaft.

THE LUBRICATING SYSTEM

Features of the lubrication system are best seen in FIGS. 2 and 14–17, in which the numeral 251 denotes radial passages in rotor 19 abreast of each piston and extending from rotor axial cavity 110 to the periphery of the rotor into which they open between rotor high compression rings 105, so that oil in gear housing 51 and axial cavity 110 is carried by centrifugal force through passages 251 toward the annular space on the rotor periphery between adjacent high compression rings 105. Intermediate the ends of the piston vane cavities 73 each of the rotor radial oil passages 251 communicates via a port 252 with the adjacent piston cavity and some of the oil enters the piston cavity to lubricate it.

Figure 15:
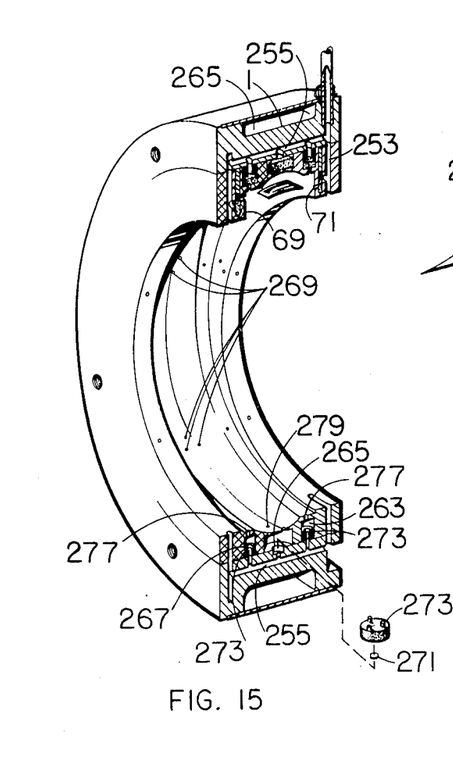
FIG. 15 is a perspective view of the engine block and block liner, sectionalized along the vertical diametral plane to show lubricating passages.

In FIG. 15, the arrangement of the lubricating system parts contained by the engine body liner 65 is seen. Each of the liner flanges 69 and 71 is formed with a plurality of radial passages 253 spaced apart from each other equal distances angularly of the liner and arranged for registration with rotor radial passages 251. Corresponding liner passages 253 and 254 in flanges 69 and 71 are connected at their outer ends by passageways 255 extending parallel to the rotor axis so that oil will pass from rotor passageways 251 into liner radial passageways 253, thence into engine block passageways 255, and on into and inwardly through liner radial passageways 254. Between the paired high compression rings 105 on the left hand end of the rotor, radial passageways 261 originate in alignment with liner passageways 254 and terminate in the adjacent side of the piston vane cavities 73 remote from oil outlet port 252, so that oil will pass from liner passageway 254 into rotor passageway 261 and thence into the piston vane cavity, where it and the oil admitted through port 252 will be distributed through the action of the piston rings to effect lubrication of the pistons as they move radially of the rotor.

For lubricating the engaging portions of the liner interior and piston vane crown rings 81 and wiper bars 85, between liner flanges 69 and 71, the liner is formed with a plurality of angularly spaced groups of three oil sumps or pockets 263, 265 and 267, each of which communicates with the liner interior periphery by means of outlet ports 269. Each oil sump 263, 265 and 267 communicates with the adjacent body passageways 255 by means of one-way check valves 271 and contains an absorbent oil gland 273 capable of accumulating, in its pores, oil fed into it from passageways 255, and oil accumulated in gland 273 is fed through outlet ports 277 and 279 with the interior cylindrical and toroidal surfaces of liner 65 to provide continuous lubrication between these surfaces and piston vane wiper bars 85 and crown rings 81.

Figure 14:
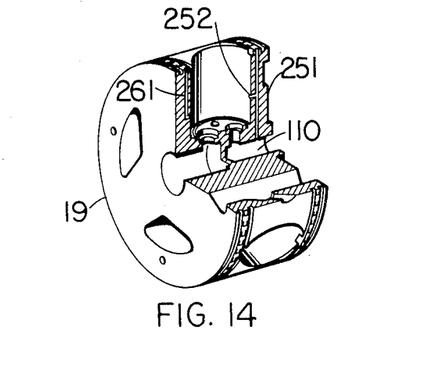
FIG. 14 is a perspective view of the rotor with one quadrant removed to show lubricating passages.
Figure 16:
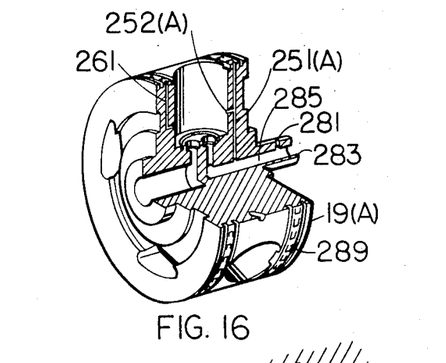
FIG. 16 is a perspective view of a rotor with one quadrant removed to show modified lubricating passages.
Figure 17:
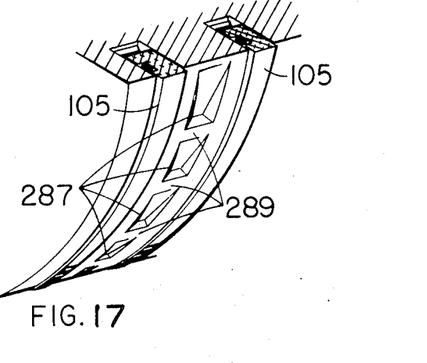
FIG. 17 is an enlarged view of a section of the periphery of the rotor of FIG. 16.

FIGS. 16 and 17 illustrate a modified form of rotor 19a, in which oil is fed by gravity through a radial passageway 281 in the rotor hub 283 and thence passes through axial passageway 285 into radial passages 251a which correspond to passages 251 of FIG. 14. In the embodiment of FIGS. 16 and 17, between each pair of compression rings 105, the rotor periphery is formed with a series of wedge-shaped depressions 287 rectangular in plan and spaced apart a slight distance circumferentially of the rotor to define between them a series of vanes 289, which function as an oil pump to draw oil through rotor radial passages 251a and force it into body liner passages 253, and to draw it from liner passages 254 and force it into rotor radial passages 261.

MODIFICATIONS

Figures 18, 21:
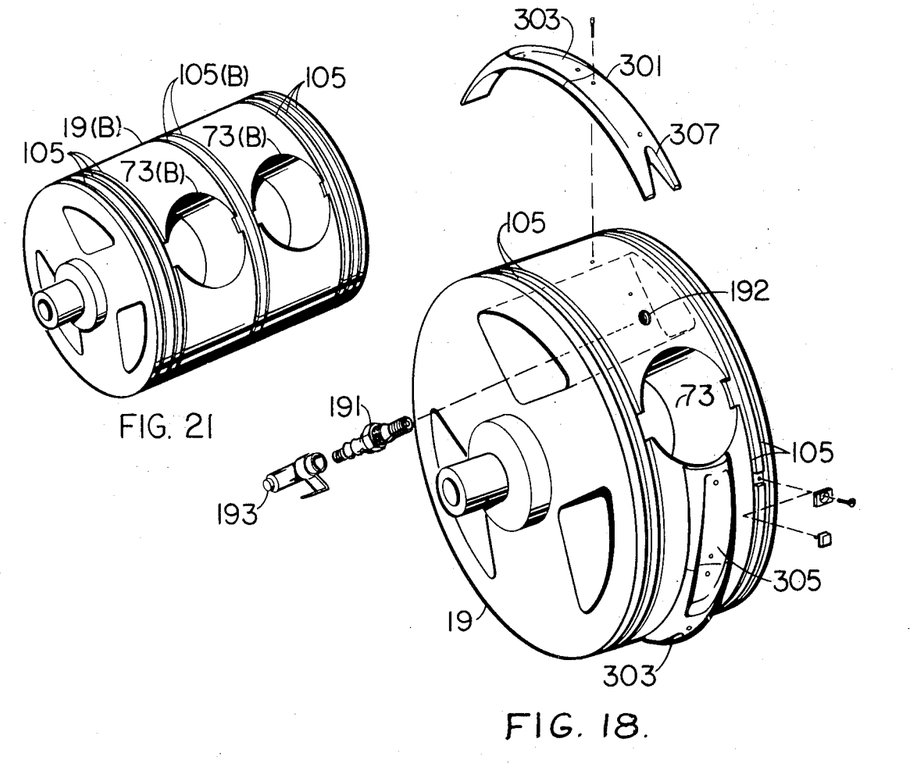
FIG. 18 is a partly disassembled perspective view of a modified rotor construction.
FIG. 21 illustrates a modified rotor construction with two sets of piston vanes.

In FIG. 18, the rotor 19 is modified by the addition of three annular segments 301 to its peripheral surface between adjacent piston vane cavities 73 to decrease the volume of the compression chambers and thus increase compression. Each of the segments has a toroidal outer surface corresponding in maximum cross section to the toroidal cavity 67 in the body liner, and both end portions of the segments are formed with flat-bottom cavities 303 and 305 separated by a full toroidal cross section partition 307 intermediate the ends of the segments. The ends of segments 301 ahead of the piston vane cavities are cut away in the form of a V with its apex at the spark plug holes 192 in the rotor periphery, to form a precombustion chamber in which the fuel mixture, because of the restricted size of the chamber defined by the V-shaped cut is highly compressed at the moment of ignition, i.e., when the preceding piston vane is at the point of tangency of the rotor and body, as is piston vane 73(2) in FIG. 1.

Figure 19:
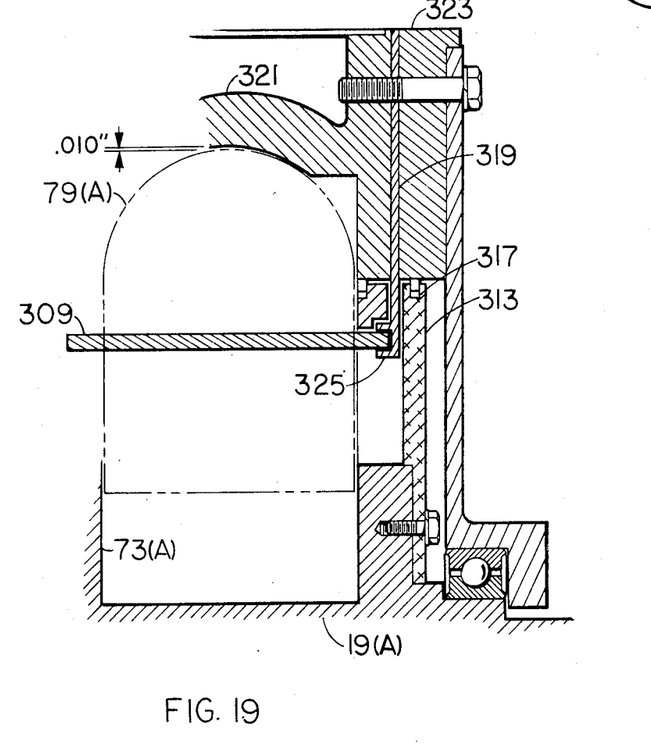
FIG. 19 is a fragmentary diametral sectional view of a modified piston vane, rotor and engine block construction.

A modified form of piston vane and associated parts of the rotor are illustrated in FIG. 19, in which each piston vane 79a is diametrally apertured to permit the passage therethrough of a bar 309 extending parallel to the rotor axis and projecting outwardly of piston vane 79a into radial slot 301 in the rotor 19a at both sides of the piston vane cavity, the outer sides of the slots being closed by annular plates 313 bolted to the flat ends of the rotor and forming a part of it with one of the rotor compression rings 105 at each end of the rotor mounted in an annular groove in the rotor periphery adjacent the piston cavities therein and the other rotor compression ring 105 recessed in a groove 317 in the periphery of closure plate 313, the latter being spaced from the periphery of the rotor to permit the intrusion in slot 311 of an annular plate 319 mounted between main body member 321 and outer body annuli 323. Along its inner rim, each annular plate is formed with an annular groove 325 facing the piston vane cavities 73a and slidably receiving the ends of piston vane bars 309. Groove 325 is concentric with the inner surface of engine body 321 so that irrespective of the angular position of the eccentrically mounted rotor therein, the piston vanes 73a will constantly be maintained in uniform radial relation with the interior of the piston body, preferably very slightly spaced therefrom in the order of 0.007 to 0.010 inch whereby to effectively block the passage of gases between the chambers defined by the several piston vanes, while eliminating frictional engagement and consequent wear between the piston vane crown rings and the internal periphery of the body.

Figure 20:
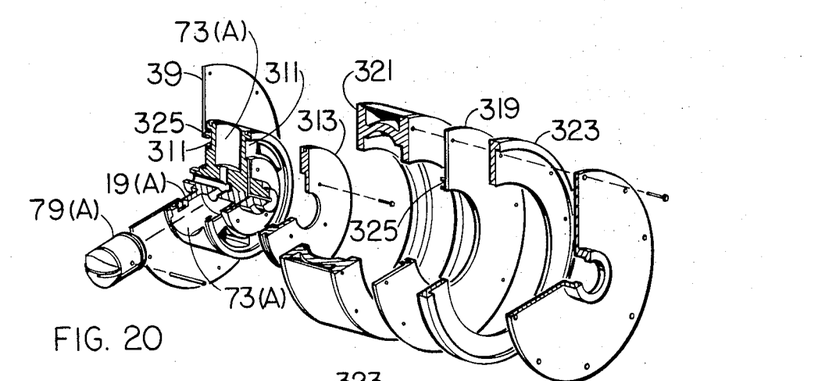
FIG. 20 is a disassembled perspective view of an engine embodying the modified features of FIG. 19.

An exploded view of a simplified form of the engine incorporating the construction of FIG. 19 is provided by FIG. 20, in which, it will be noted, lubrication of the opposed surfaces of the piston vanes and engine block is made unnecessary because of the elimination of frictional engagement between these parts.

Another modification of the engine incorporates a rotor 19b, illustrated in FIG. 21, with two sets of piston vane cavities 73b, 73b separated by an intermediate pair of compression rings 105b. It will be understood that an engine incorporating rotor 19b will have a corresponding dual exhaust and ignition system.

Figure 22:
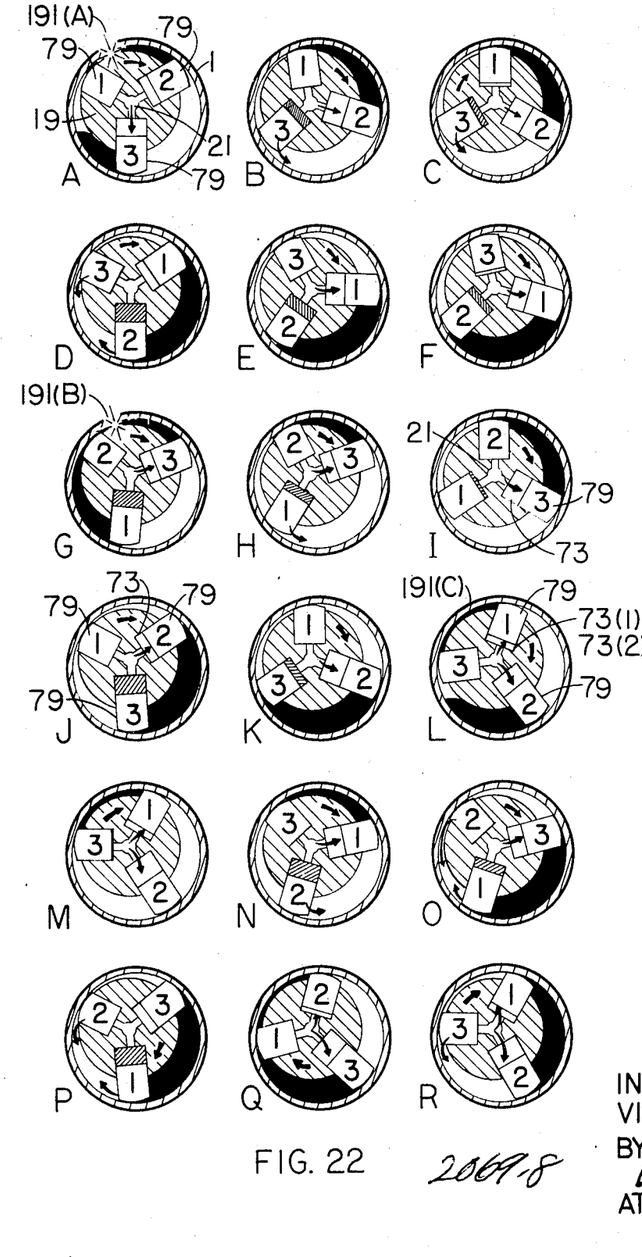
FIG. 22 is a series of diagrams illustrating the operation of the engine.
Figure 23:
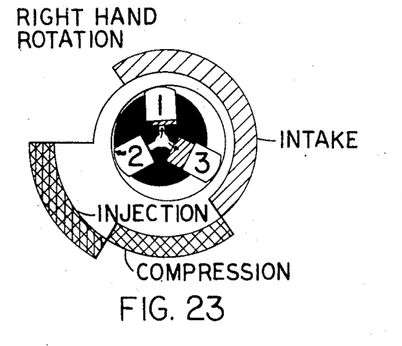
FIG. 23 is a diagram showing intake and injection phases.
Figure 24:
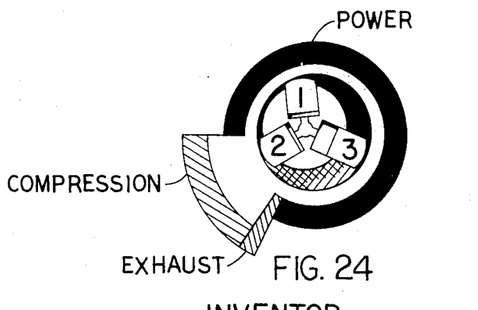
FIG. 24 is a diagram showing compression, power and exhaust phases.

Operation of the preferred embodiment is shown diagrammatically in FIG. 22 (A–R) in which, it will be noted, the position of the engine is rotated 180° from that shown in FIG. 1, so that in FIG. 22 the point of tangency of the rotor and block is approximately at the 10 o'clock position instead of the 4 o'clock position of FIG. 1. Viewing FIG. 22 from left to ring, commencing on the top line in diagram A, piston vane 79(1) is approaching the point of tangency, spent fuel mixture is beginning to be exhausted between vanes 3 and 1, and the compressed fuel mixture between vanes 79(1) and 79(2) is ignited by spark plug 191a and thereby exploded to act on the large exposed surface of vane 79(2), and, as indicated by radial arrow, fuel mixture is being drawn through valve 49 into the rotor cavity of piston vane 79(3). In diagrams B and C the power stroke of vane 79(2) continues, vane 79(3) introduces fuel mixture into the space between vanes 79(3) and (2) and the exhaust phase between vanes 79(3) and (1) is completed. In diagram D, the power phase between vane 79(2) and (1) continues, and vane 79(2) commences to introduce fuel mixture into the space between vanes 79(2) and (3) along with vane 79(3). In diagram E, the power phase between vanes 79(2) and (1) continues, and the fuel mixture injected between vanes 79(2) and (3) is compressed as vane 79(3) approaches the tangent point, and in diagram F, the power phase between vanes 79(2) and (1) ends and the ignition and compression phase between vanes 79(3) and (2) approaches its end as vane 79(2) approaches the tangent point. In diagram G, the spent fuel mixture is being exhausted between vanes 79(1) and (2) and the compressed fuel mixture between vanes 79(2) and (3) is ignited by spark plug 191b, and thereby exploded to commence the power phase between vanes 79(2) and (3), which continues through diagram K. In diagram H, vane 79(1) is beginning to inject fuel mixture from its aft side into the chamber between vanes 79(1) and (3), and as vane 79(3) moves outwardly it draws fuel mixture from axial cavity 21 into vane cavity 73(3) as indicated by radial arrow, in diagrams H and I, after which, as shown by arcuate arrow in diagram J, vane 79(3) injects fuel into the chamber between vanes 79(1) and (3) and vane 79(2) begins to draw fuel mixture into its cavity 73(2). In diagram K, the compression phase between vanes 79(3) and (1) is approaching completion, and in diagram L spark plug 191c ignites the compressed fuel mixture between these vanes, initiating the power phase of this chamber, which continues into diagram O. Meanwhile, as shown by radial arrow in diagram L, vane 79(1) is beginning to draw fuel mixture into its cavity 73(1) and the chamber between vanes 79(2) and (3) is beginning to exhaust its spent charge of fuel mixture. In diagram M, vanes 79(1) and 79(2) are both drawing fresh fuel mixture into their respective cavities, while in diagram N exhaust of chamber 79(3) (2) is being completed, and vane 79(2) is discharging fuel mixture, precompressed in its cavity, from its aft side into the chamber between vane 79(1) and (2), after which, as shown by arcuate arrow in diagram O and P, vane 79(1) discharges fuel mixture from its forward side into the same chamber. In diagram Q, the full cycle is nearly complete, with the chamber between vanes 79(1) and (2) completing its compression stroke just prior to ignition as shown in diagram A. Diagram R shows the parts early in succeeding cycle, between the positions of diagrams C and D. From the foregoing description of the operation, taken together with FIG. 22, it will be noted that each compression-combustion chamber 79(1)-(2), 79(2)-(3) and 79(3)-(1) fires only once during two complete revolutions (diagrams A–J and J–4) of the rotor.

The details of the engine and modifications thereof disclosed herein may be modified substantially without departing from the spirit of the invention and the exclusive use of any modifications as come within the scope of the appended claims is contemplated.

I claim:

1. In a rotary device, a stator block having a circular interior surface, a cylindrical rotor eccentrically mounted in said block for rotation therein about its axis, a plurality of radial cavities in said rotor, pistons slidably mounted in said cavities and adapted to have a portion of their outer ends in constant sealing relation with said body thereby defining a plurality of chambers between the periphery of said rotor and the circular interior surface of said block, means for introducing fluid into said rotor radial cavities inwardly of said pistons, and means for sequentially injecting such fluid from each said radial cavity into both said chambers fore and aft of the respective piston.

2. In a rotary device according to claim 1, said block circular interior surfaces being formed with a concentric toroidal cavity, said pistons having crown surface portions of arcuate shape receivable within said toroidal cavity, and means for maintaining said piston crown surface portions in uniformly spaced proximate relation with said toroidal cavity surface whereby to prevent frictional wear thereon while providing an effective seal.

3. In a rotary device according to claim 1, each said piston crown surface including a raised arcuate surface along a diameter of said piston coplanar with the axis of said rotor and dividing said crown surface into fore and aft portions.

4. In a rotary device according to claim 3, said injecting means comprising a pair of passages connecting the base of each said piston with the fore and aft portions of the respective piston crown.

5. In a rotary device according to claim 4, said injecting means including valve means selectively opening and closing said passages.

6. In a rotary device according to claim 5, said valve means comprising a sleeve and spool in the base of said piston, extending axially of said piston.

7. In a rotary device according to claim 6, separate radially movable elements in said rotor in alignment generally radially of said rotor with said sleeve and spool for selectively actuating said sleeve and spool.

8. In a rotary device according to claim 5, said injecting means also including movable means within said rotor engageable with said valve for actuating the same.

9. In a rotary device according to claim 8, said valve actuating means comprising a cam driven by said rotor and radial valve lifters engaging said cam.

10. In a rotary device according to claim 1, there being three of said radial cavities and pistons therein equiangularly spaced about said rotor.

11. In a rotary device according to claim 3, said injecting means being arranged to inject fluid sequentially from the aft portion of one piston and from the forward portion of the following piston sequentially as said pistons approach the point of tangency of said rotor and said body.

12. In a rotary device according to claim 11, wherein said fluid is a gaseous fuel mixture, spark ignition means located to ignite the mixture in each space outwardly of the rotor between adjacent pistons shortly after the trailing piston has passed the point of tangency of the rotor and body.

13. In a rotary device according to claim 12, said spark ignition means comprising spark plugs mounted in said rotor forward of each of said pistons, each said spark plug having a contact in the side of said rotor, and a single stationary contact in the side of said engine body adaptable to wipingly engage each said spark plug immediately after the following piston has passed the point of tangency of the rotor and engine body.

14. In a rotary device according to claim 3, said block interior surface being generally cylindrical and bisected by said toroidal cavity, each said piston crown mounting a pair of bars parallel to the general plane of said raised arcuate surfaces, said bars projecting axially from said piston at each end of said raised surface, and means biasing said bars into wiping engagement with said cylindrical interior surface of said block on both sides of said toroidal cavity whereby to maintain said raised arcuate surface in uniformly spaced proximate relation with said toroidal surface.

15. In a rotary device according to claim 14, said raised arcuate portion comprising a half ring, said crown being grooved along a diameter lying in an axial plane of said rotor to receive said half ring.

16. In a rotary device according to claim 15, said pistons being formed with outwardly open radial slots parallel to said axial plane, said bars being slidably received in said slots for movement axially of said rotor.

17. In a rotary device according to claim 16, said biasing means comprising compression springs positioned in said slots beneath said bars.

18. In a rotary device according to claim 1, an opening in the periphery of said block in radial alignment with said rotor and of sufficient size to accommodate one of said pistons, and a plug for said hole.

19. In a rotary device according to claim 18, said plug including an exhaust port angularly spaced therein from the point of tangency of said rotor and said block interior surface.

20. In a rotary device according to claim 1, said means for introducing fuel into said rotor piston cavities comprising an axial passageway in said rotor, radial passages connecting said axial passageway with said radial cavities, and check valves in said radial passageways permitting the radially outward movement of fuel mixture therethrough but preventing inward radial movement of the fuel mixture.

21. In a rotary device according to claim 3, said block having a pair of inwardly directed annular flanges along the margins of said block circular interior surface, said flange peripheries being eccentric with respect to said circular interior surface and concentric with respect to said rotor, and circumferential sealing means on said rotor and spaced apart axially thereof for engagement with said flanges.

22. In a rotary device according to claim 21, said circular interior surface being partly of cylindrical shape, said maintaining means comprising flat bar means mounted in said piston crown parallel to said raised arcuate surface thereof and engageable with cylindrical surfaces of said circular interior surface and with the inner transverse surfaces of said flanges, resilient means biasing said bar means outwardly radially of said rotor.

23. In a rotary device according to claim 2, wherein said maintaining means comprises circular guide means affixed to said block and concentric with said circular interior surface thereof, and follower elements carried by said pistons and projecting therefrom in a direction parallel to said rotor axis into cooperative engagement with said guide means for movement therealong during rotation of said rotor.

24. In a rotary device according to claim 23, each said piston cavity having a radially extending groove between it and the adjacent end of the rotor, a circumferential slot in the peripheral surface of said rotor communicating with said grooves, said guide means including a plate projecting radially through said slot into said grooves, said follower element of each said piston extending into the associated groove and therein engaging said guide means.

25. In a rotary device, a stator block having a circular interior surface, a cylindrical rotor eccentrically mounted in said block for rotation therein about its axis, a plurality of radial cavities in said rotor, pistons slidably mounted in said cavities, said block interior surface including a concentric toroidal cavity, said pistons having crown surface portions of arcuate shape receivable within said toroidal cavity, means for maintaining said piston crown surface portions in uniformly spaced proximate relation with the surface of said toroidal cavity whereby to prevent frictional wear thereon while providing an effective seal, said block interior surface including a cylindrical portion, space-maintaining means comprising flat ended elements mounted in the crowns of said pistons in planes radial of said rotor axis and resiliently biased outwardly radially of said rotor into sliding engagement with said cylindrical surface portion, each piston crown being formed with an arcuate groove in a plane radial of the rotor axis and diametral of the piston, said crown surface portions comprising ring sections seated in said grooves, each said piston being formed with a pair of slots extending inwardly from the crown parallel to and adjacent the end portions of said ring section, said flat ended elements being rectangular bars slidably mounted in said slots, said block having a pair of annular flanges extending inwardly from the ends of said interior surface and having their rims eccentric with respect to said interior surface and concentric with respect to said rotor, said flanges being spaced apart a distance substantially equal to the diameter of said rotor cavities, said piston slots being open at the crown and sides of the piston, the outer edges of said bars being substantially flush with the peripheries of said pistons, whereby said bar outer edges are in wiping engagement with the radial surfaces of said block flanges and the flat ends of said bars are wipingly engaged with said block cylindrical surface, and sealing means on the peripheries of said rotor between said piston cavities and the adjacent ends of said rotor, said sealing means being slidingly engageable with the rims of said block flanges, each said sealing means comprising a pair of rings, one ring of each pair being substantially tangential to said piston cavities.

26. In a rotary device according to claim 25, an axial passageway in said rotor, a source of lubricant communicating with said passageway, passageways in said rotor extending radially outwardly from said axial passageway and communicating with the periphery of said rotor between the rings of each pair of sealing rings.

27. In a rotary device according to claim 26, said radial passageways having their outlets between the rings of one pair only of said sealing rings, there being passages in said block connecting the rims of said flanges whereby to pass lubricant from the space between said one pair of rings to that between said other pair of rings.

28. In a rotary device according to claim 27, said radial passageways having branches into the adjacent side of said piston cavities, additional radial passageways extending inwardly from the space between said other pair of rings and communicating with the opposite sides of said piston cavities.

29. In a rotary device according to claim 26, lubricant pockets in said block communicating with said block connecting lubricant passage and with the interior surface of said block.

30. In a rotary device according to claim 29, lubricant glands of absorbent material for accumulating lubricant and distributing it to the interior surface of said block.

* * * * *